United States Patent [19]

Yoshida et al.

[11] Patent Number: 5,233,431
[45] Date of Patent: Aug. 3, 1993

[54] IMAGE PICKUP DEVICE

[75] Inventors: Masanori Yoshida; Ryuji Kawaguchi; Kiyotaka Kaneko; Katuo Asami; Masaaki Orimoto; Naoki Takatori, all of Tokyo, Japan

[73] Assignee: Fuji Photo Film Co., Ltd., Kanagawa, Japan

[21] Appl. No.: 782,050

[22] Filed: Oct. 23, 1991

[30] Foreign Application Priority Data

Oct. 26, 1990 [JP] Japan .................. 2-290549
Oct. 26, 1990 [JP] Japan .................. 2-290551

[51] Int. Cl.⁵ ............... H04N 5/232; G02B 13/16; G01J 1/36
[52] U.S. Cl. .................. 358/227; 358/225; 250/204; 359/723
[58] Field of Search ........... 358/225, 227; 250/204; 359/723; 382/31, 33, 34

[56] References Cited

U.S. PATENT DOCUMENTS

| | | | |
|---|---|---|---|
| 4,474,446 | 10/1984 | Reynolds et al. | 354/402 |
| 4,554,585 | 11/1985 | Carlson | 358/209 |
| 4,611,243 | 9/1986 | Morisawa et al. | 358/225 |
| 4,641,022 | 2/1987 | Suzuki | 250/204 |
| 4,757,387 | 7/1988 | Saito | 358/225 |
| 4,805,028 | 2/1989 | Nishioka et al. | 358/225 |
| 5,029,010 | 7/1991 | Shiraishi | 358/225 |

Primary Examiner—Michael T. Razavi
Assistant Examiner—Joseph Colaianni
Attorney, Agent, or Firm—Sughrue, Mion, Zinn, Macpeak & Seas

[57] ABSTRACT

An image pickup device which, in placing a phase type optical low pass filter in front of a taking lens, is able to cope with the varying focal distances of the taking lens only by a single piece of phase type optical low pass filter and which is also able to obtain a large quantity of information to be used for focusing detection in the auto focusing (AF) operation. The image pickup device is composed of a taking lens having a variable focal distance, a solid state image pickup element on which an object light image is formed through the taking lens, a phase type optical low pass filter which is disposed in front of the taking lens in a freely rotatable manner, and a device for rotating the phase type optical low pass filter according to the focal distances of the taking lens so as to be able to remove a given spatial frequency component corresponding to the pixel pitch of the solid state image pickup element. The image pickup device further includes a device which, when an AF detect circuit executes a focusing detection operation, rotates the optical low pass filter 90° from a state in which the spatial frequency component in the horizontal direction can be removed, or retreats the optical low pass filter from a photograph optical system, and also which returns the optical low pass filter to its original state when photographing.

4 Claims, 6 Drawing Sheets

IMAGE PICKUP DEVICE

BACKGROUND OF THE INVENTION

1. Field of the Invention

The present invention relates to an image pickup device and, in particular, to an image pickup device which uses an optical low pass filter of a phase type.

2. Description of the Related Art

In general, in a solid state image pickup element (such as a CCD) used in a video camera or an electronic still camera, an incident light image is sampled by sensors which are arranged in vertical and horizontal directions at given intervals from one another. For this reason, the highest spatial frequency that can be resolved is one-half of the sampling spatial frequency to be determined by the arrangement of the sensors, that is, a Nyquist frequency. If the incident light image includes spatial frequencies which are higher than the Nyquist frequency, the higher spatial frequencies will be returned in an ordinary band to produce a false signal or a moire effect.

Therefore, in the image pickup device of this type, such higher frequencies are removed by use of an optical low pass filter (which will be referred to as "OLPF" hereinafter) before sampling.

This OLPF includes a crystal OLPF using the double refraction of a crystal and a phase type OLPF having a surface varying unevenly at a given distance. The phase type OLPF is advantageous in that it can be produced in commercial quantity and thus it can be supplied at low costs. Normally, the OLPF is disposed nearer to the CCD side than to the magnification varying system of a taking lens.

Also, as an auto-focus device (AF device), there is used a device which performs a focusing detection and a focusing adjustment of the taking lens in accordance with an output signal from the CCD that photo-electrically converts an object light entering through the above OLPF. In other words, the AF device samples and integrates the high frequency component of the output signal obtained from the CCD, and by using the resultant integration value as an AF evaluation value for focusing decision, controls the focusing of the taking lens so that the AF evaluation value becomes the greatest.

However, if the phase type OLPF is disposed in front of a taking lens which has a variable focal distance (or magnification), then the phase type OLPF is not able to correspond to the variations of the focal distances of the taking lens and thus it is not able to remove a desired spatial frequency component.

On the other hand, if the phase type OLPF is disposed in front of the taking lens, then the back length of the taking lens can be reduced to thereby provide an advantage in space and to decrease the possibility that a ghost image can be produced. Further, in this case, it is possible to increase the given distance between the surface unevennesses of the phase type OLPF to thereby be able to provide an easy optical pattern. Also, in the back focus adjustment of the taking lens, the OLPF can be disconnected from the optical system with ease so that the back focus of the taking lens can be adjusted easily.

However, in the AF device of the above-mentioned conventional image pickup device, as shown by a solid line in FIG. 6, due to the fact that the focusing detection is executed by the OLPF in accordance with a video signal (that is, the information contained in a range A shown by oblique lines) in which a modulation transfer function of a given spatial frequency ($f_c$) has been lowered, the amount of information is decreased and it is difficult to focus an object which has the above-mentioned given spatial frequency component.

SUMMARY OF THE INVENTION

The present invention aims at eliminating the drawbacks found in the above-mentioned conventional image pickup devices.

Accordingly, it is an object of the invention to provide an image pickup device which, when placing a phase type OLPF in front of a taking lens, is able to correspond to the varying focal distances of the taking lens with a single phase type OLPF, and is thus advantageous is space and cost.

It is another object of the invention to provide an image pickup device which is able to remove a false signal by the OLPF and at the same time is able to obtain a large quantity of information for focusing detection in auto-focusing (AF).

In order to achieve the above-mentioned objects, according to the invention, there is provided an image pickup device which comprises: a taking lens having a variable focal distance; a solid state image pickup element on which a light image of an object is formed through the taking lens; a phase type optical low pass filter disposed rotatably in front of the taking lens; and, means for rotating the phase type optical low pass filter according to the focal distances of the taking lens so as to be able to remove a given spatial frequency component corresponding to the pixel pitch of the solid state image pickup element.

Also, in attaining the above-mentioned objects, according to the invention, there is provided an image pickup device which comprises: a solid state image pickup element on which a light image of an object is formed through a taking lens; an optical low pass filter disposed rotatable about the optical axis of a photograph optical system for removing a spatial frequency component in a horizontal direction corresponding to the pixel pitch of the solid state image pickup element; an auto-focusing device for performing focusing detection in accordance with an output signal obtained from the solid state image pickup element and for adjusting the focusing of the taking lens; and, means, when the focusing detection is performed by the auto-focusing device, for rotating the optical low pass filter 90° from a state in which the spatial frequency component in the horizontal direction can be removed, thereby returning the optical low pass filter to its original state.

Further, according to the invention, there is provided an image pickup device which comprises: a solid state image pickup element on which a light image of an object is formed through a taking lens; an optical low pass filter disposed so as to be free to advance and retreat with respect to a photograph optical system for removing a spatial frequency component in a horizontal direction corresponding to the pixel pitch of the solid state image pickup element; an auto-focusing device for performing focusing detection in accordance with an output signal obtained from the solid state image pickup element and for adjusting the focusing of the taking lens; and, means, when the focusing detection is performed by the auto-focusing device, for retreating the optical low pass filter from the photograph optical system and, when photographing, for advancing the optical low pass filter into the photograph optical system.

According to the invention, due to the fact that the phase type OLPF is disposed in front of the taking lens, space can be used more advantageously than the conventional device, and an easy or loose optical pattern can be provided for the phase type OLPF, which makes it easy to manufacture the phase type OLPF. Also, the phase type OLPF can be rotated correspondingly to the focal distances of the taking lens, so that the pitches of the unevennesses of the OLPF in the horizontal direction can be substantially varied. Thanks to this, it is possible to remove a given spatial frequency component corresponding to the pixel pitch of the solid state image pickup element regardless of the variations of the focal distance of the taking lens.

Also, according to another embodiment of the invention, in the focusing detection, the OLPF is turned 90° or retreated from the photograph optical system and thus a given spatial frequency component in the horizontal direction corresponding to the pixel pitch of the solid state image pickup element is not removed, thereby increasing the amount of information for focusing detection. In photographing, the OLPF is returned to its original state and the given spatial frequency component is removed, thereby preventing generation of a false signal.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiments of an image pickup device according to the present invention with reference to the accompanying drawings.

Figure 1:
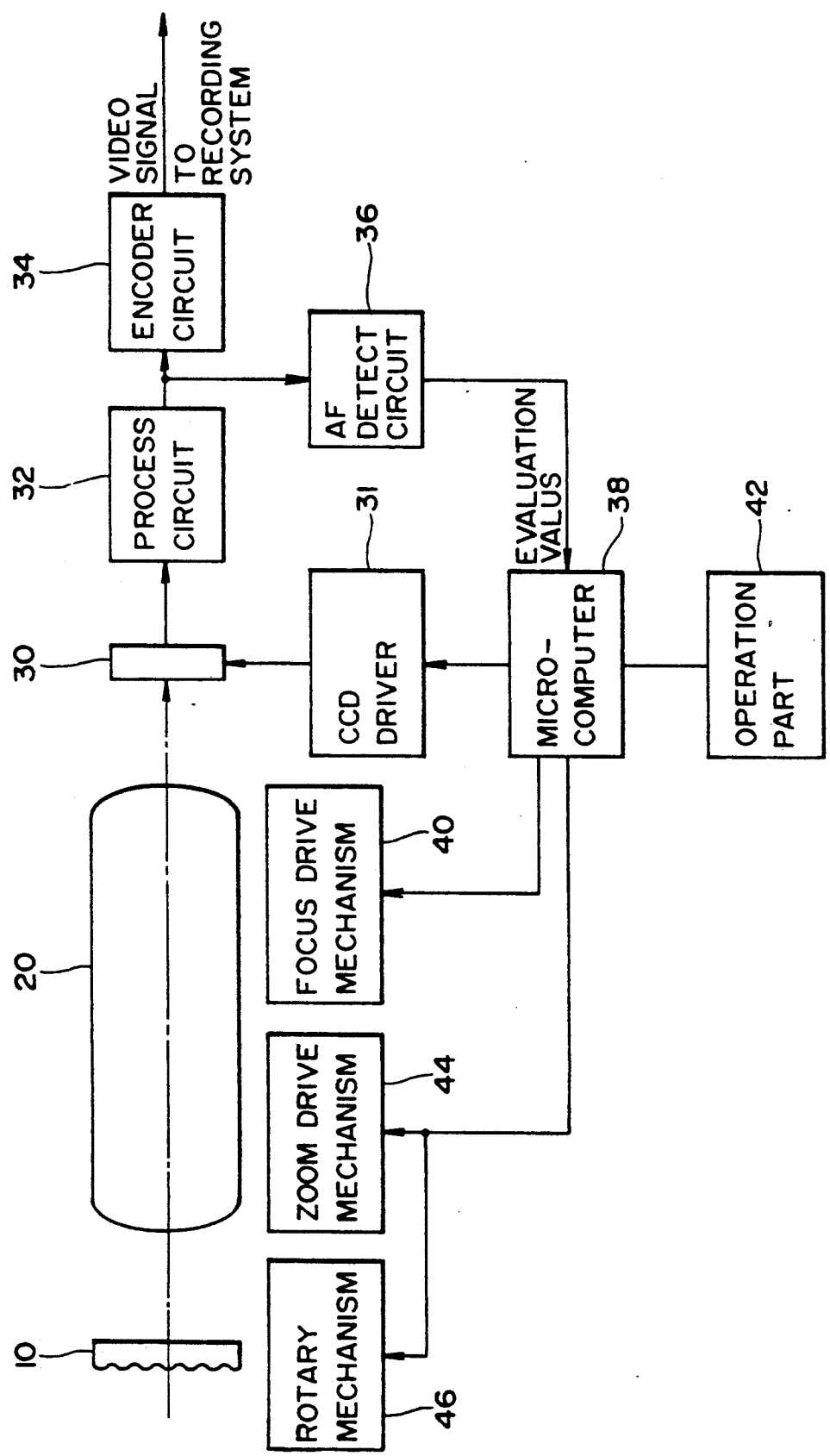
FIG. 1 is a block diagram of an embodiment of an image pickup device according to the invention.

Referring first to FIG. 1, there is shown a block diagram of an embodiment of an image pickup device according to the invention.

In FIG. 1, a light image of an object is formed through a phase type OLPF 10 and a taking lens 20 on a CCD 30 and is then converted by the respective sensors of the CCD into a signal electric charge having a quantity corresponding to the intensity of the light. The CCD is driven by a CCD driver 31, and the signal electric charges converted by the CCD 30, after they are read out sequentially and are signal processed by a process circuit 32, are applied to an encoder circuit 34 and an AF detect circuit 36.

The AF detect circuit 36, which is mainly composed of a high band pass filter, an integration circuit and the like, extracts and integrates only a high frequency component of a brightness signal input from the process circuit 32 and outputs the integration value, as an evaluation value for judgement of focusing, to a microcomputer 38.

The microcomputer 38 outputs a control signal to a focus drive mechanism 40 in such a manner that the evaluation value input from the AF detect circuit 36 becomes the greatest value, thereby driving a focus lens within the taking lens 20 to achieve focusing.

Also, the microcomputer 38, when a zoom button (not shown) is operated in an operation part 42, outputs a control signal to a zoom drive mechanism 44 to thereby drive a magnification varying lens system within the taking lens 20 to perform a zooming operation and at the same time, as will be discussed later, to thereby rotate the phase type OLPF 10 through a rotary mechanism 46.

Next, description will be given below of the reason why the phase type OLPF 10 is rotated according to the zooming of the taking lens 20.

In a photograph optical system shown in FIG. 1, assuming that:

P; pitch of phase type OLPF 10 (lenticular lens), $f_T$; focal distance of taking lens 10 in tele, $f_L$; focal distance of phase type OLPF (lenticular lens)

$\Delta$; light separation width of phase type OLPF 10;

then the following equation is obtained:

$$\frac{Pf_T}{2f_L} = \Delta \therefore f_T = \frac{2f_L}{P}\Delta \tag{1}$$

Figure 2:
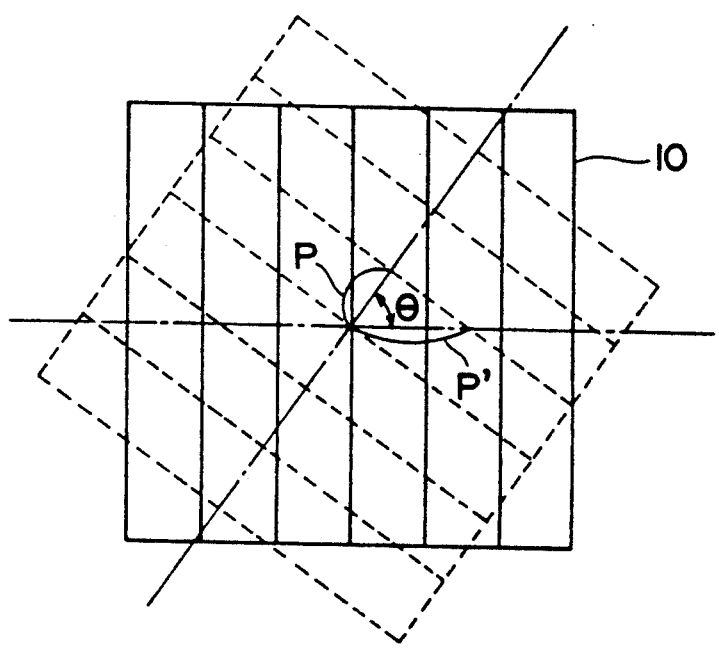
FIG. 2 is an explanatory view used to explain the principles of the invention.

Here, as shown in FIG. 2, when the phase type OLPF 10 having a pitch P is rotated by an angle of $\theta$, then a pitch P', which is an apparent pitch in a horizontal direction, can be expressed by the following equation:

$$P' = \frac{P}{\cos\theta} \tag{2}$$

Therefore, when the focal distance of the taking lens 20 in wide is expressed as $f_W$, then the following equation can be obtained from the (1) and (2) equations:

$$f_W = \frac{2f_L}{P'}\Delta = \frac{2f_L}{P}\Delta \cos\theta \tag{3}$$
$$= f_T \cos\theta$$

Also, when the above equation (3) is deformed, then the following equation is obtained:

$$\theta = \cos^{-1}(f_W/f_T) \tag{3}'$$

That is, by rotating the phase type OLPF by an angle of $\theta$ shown in the equation (3)', there can be obtained the phase type OLPF that corresponds to the focal distance $f_W$.

Figure 3:
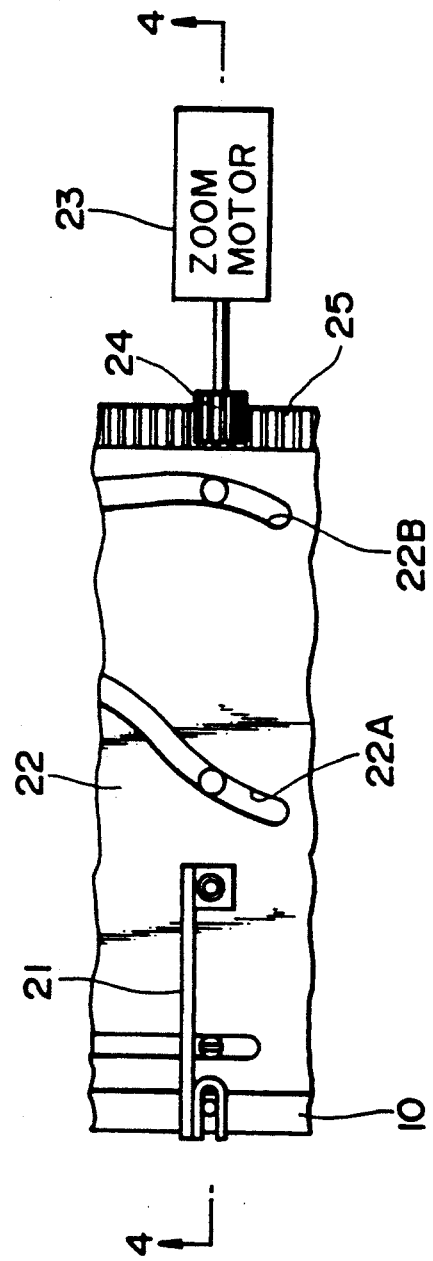
FIG. 3 is a plan view of a phase type OLPF, a taking lens and the like employed in the embodiment shown in FIG. 1.
Figure 4:
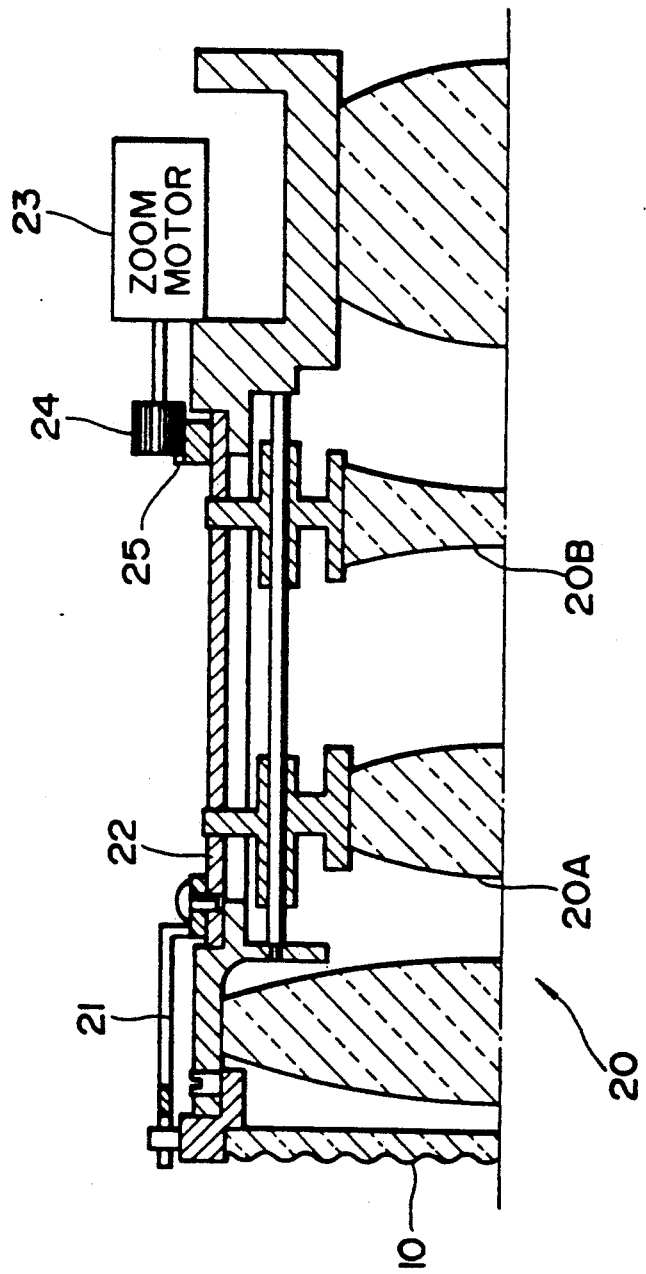
FIG. 4 is a section view taken along the line 4—4 shown in FIG. 3

Referring now to FIGS. 3 and 4, there are shown a plan view of the phase type OLPF 10, taking lens 20 and the like and a section view taken along the line 4—4 in FIG. 3, respectively.

As shown in these figures, the phase type OLPF 10 is rotatably disposed in front of the taking lens 20 and is connected through a connecting member 21 to a zoom cam barrel 22 of the taking lens 20 in such a manner that it can be rotated integrally with the zoom cam barrel 22.

For this reason, if the zoom cam barrel 22 is rotated by a zoom motor 23 by means of a gear 24 and a ring gear 25, then the magnification varying lens groups 20A, 20B are moved by the cam grooves 22A, 22B of the zoom cam barrel 22 to thereby achieve a zooming operation and at the same time the phase type OLPF 10 is rotated by means of the connecting member 21. Here, it should be noted that the cam grooves 22A, 22B are formed so that a relation between the angle of rotation of the zoom cam barrel 22 and the focal distance caused by the angle of rotation can satisfy the equation (3)'.

Figure 5:
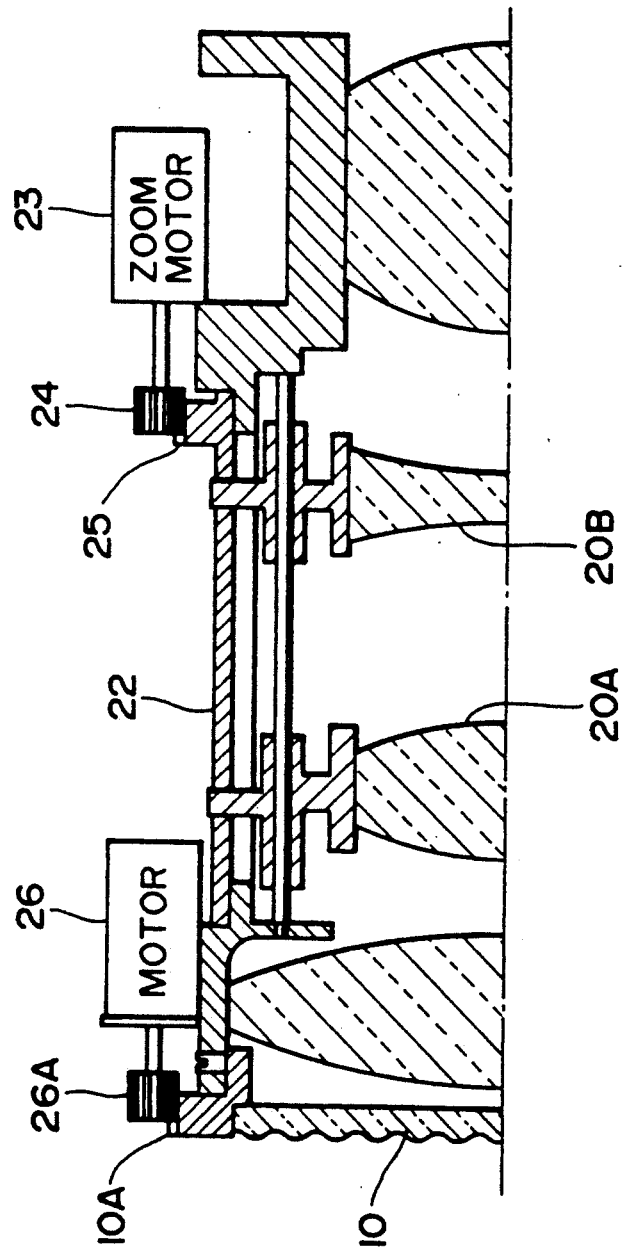
FIG. 5 is a section view of main portions of another embodiment of an image pickup device according to the invention; and, FIG. 6 is a graphical representation of MTF with respect to a spatial frequency.

Although in the above embodiment the phase type OLPF is arranged to be rotatable in link with the movement of the zoom cam barrel, this is not limitative but, as shown in FIG. 5, there may be provided independent drive means which can drive the phase type OLPF and thus the phase type OLPF may be rotated according to the focal distance of the taking lens by the drive means.

In other words, FIG. 5 is a section view of main portions of another embodiment of an image pickup device according to the invention. In FIG. 5, parts used in common with FIG. 4, are given the same designations and the detailed description thereof is omitted here.

As shown in FIG. 4, the present embodiment is structured in such a manner that the phase type OLPF 10 can be rotated at a proper angle by a motor 26 through a gear 26A and a ring gear 10A.

In the image pickup device constructed in the above-mentioned manner, the microcomputer 38 shown in FIG. 1, when a shutter release button (not shown) is halfway pushed in an operation part 42, instructs that the focusing of the taking lens 20 is executed. In this case, at first, the phase type OLPF 10 is rotated 90° through a rotary mechanism 46 (that is, from the motor 26 to the gear 26A and ring gear 10A shown in FIG. 5), and after then the microcomputer 38 outputs a control signal to the focus drive mechanism 40 so that the evaluation value input from the AF detect circuit 36 becomes the greatest, thereby driving the focus lens within the taking lens 20 for focusing. And, if the shutter release button is completely pushed in the operation part 42, then the phase type OLPF 10 is rotated to a given rotational position corresponding to the focal distance of the taking lens 20 before the shutter is released.

Figure 6:
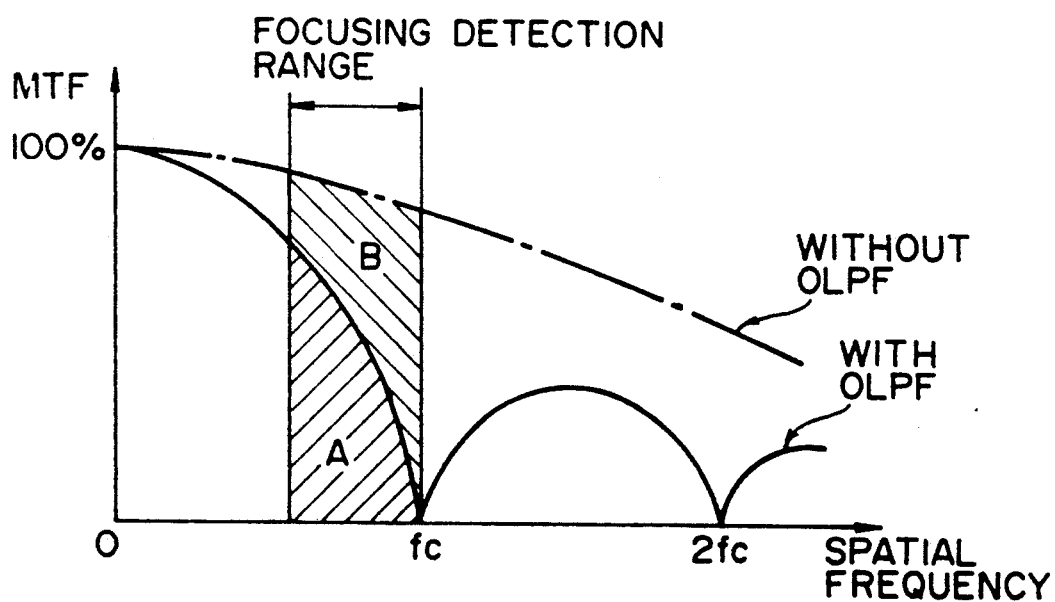

In other words, in the AF, the phase type OLPF 10 is rotated by the motor 26 in such a manner that the angle $\theta$ shown in FIG. 2 becomes 90°. Due to this, the phase type OLPF 10 is prevented from removing a given spatial frequency component in a horizontal direction, and thus an object light, which has a characteristic of such MTF with respect to a spatial frequency as shown by a one-dot chained line in FIG. 6, is allowed to enter the CCD 30. For this reason, the AF detect circuit 36 shown in FIG. 1 is now able to output a more reliable evaluation value for judgment of focusing in accordance with a video signal (that is, information in ranges A and B respectively shown by oblique lines in FIG. 6) having an MTF which is not lowered greatly.

After the AF is performed in this manner, for photographing, at first, the phase type OLPF 10 is rotated to the angle $\theta$ to satisfy the equation (3)' in accordance with the current focal distance of the taking lens 20 and the shutter is then released for recording.

Although in the embodiment shown in FIG. 5 the phase type OLPF 10 is rotatably disposed in front of the taking lens 20, this is not limitative but the phase type OLPF 10 may be rotatably disposed nearer to the CCD side than the magnification varying system of the taking lens 20. In this case, it is not necessary to rotate the phase type OLPF 10 according to the variations of the focal distance of the taking lens 20, but it may be rotated 90° only in the AF operation. Also, a crystal OLPF can be used in place of the phase type OLPF. Further, although the OLPF is arranged to be rotatable 90°, this is not limitative but the OLPF may be retreated from the photograph optical system in the AF operation. However, when the length of the optical path of the taking lens is varied due to the retreatment of the OLPF, then it is necessary to insert a piece of dummy glass having a given thickness in place of the OLPF in order not to vary the length of the optical path.

As has been described hereinbefore, according to the invention, the provision of the phase type OLPF in front of the taking lens provides more space, gives the phase type OLPF a freer optical pattern, and makes it easy to manufacture the phase type OLPF. In addition to these advantages, due to the fact that the phase type OLPF is arranged such that it can be rotated according to the focal distances of the taking lens, it is possible to remove a given spatial frequency component corresponding to the pixel pitch of the solid state image pickup element regardless of the variations of the focal distance of the taking lens.

Also, due to the fact that the OLPF is arranged such that it can be rotated 90° or retreated from the photograph optical system in the focusing detection operation, the MTF (especially, the cut-off spatial frequency component in a horizontal direction by the OLPF) of the object light entering the solid state image pickup element is prevented from lowering to thereby increase the quantity of information to be used for the focusing detection, so that the focusing detection operation can be executed with ease even with respect to an object including a cut-off spatial frequency component by the OLPF, which has been difficult to cope with in the conventional image pickup devices.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:
1. An image pickup device comprising:
   a taking lens having a variable focal distance;
   a solid state image pickup element on which an object light image is formed through said taking lens;
   a phase type optical low pass filter rotatably disposed in front of said taking lens; and,
   means for rotating said phase type optical low pass filter according to the focal distances of said taking lens so as to be able to remove a given spatial frequency component corresponding to the pixel pitch of said solid state image pickup element.
2. An image pickup device comprising:
   a solid state image pickup element on which an object light image is formed through a taking lens;
   a phase type optical low pass filter disposed rotatable about the optical axis of a photograph optical sys- tem for removing a spatial frequency component in a horizontal direction corresponding to the pixel pitch of said solid state image pickup element;

an auto-focusing device for executing a focusing detection operation in accordance with an output signal obtained from said solid state image pickup element and for adjusting the focusing of said taking lens; and, means for rotating said phase type low pass filter 90° from a state in which said spatial frequency component in the horizontal direction can be removed when the focusing detection operation is executed by said auto-focusing device, and for returning said phase type optical low pass filter to its original state in photographing.

3. An image pickup device comprising:

a taking lens having a variable focal distance;

a solid state image pickup element on which an object light image is formed through said taking lens;

a phase type low pass filter rotatably disposed in front of said taking lens;

an auto-focusing device for executing a focusing detection operation in accordance with an output signal obtained from said solid state image pickup element, and for adjusting the focusing of said taking lens; and, means for rotating said phase type low pass filter 90° from a state in which said spatial frequency component in the horizontal direction can be removed when the focusing detection operation is executed by said auto-focusing device, and for rotating said phase type optical low pass filter according to the focal distances of said taking lens so as to be able to remove a spatial frequency component in a horizontal direction corresponding to the pixel pitch of said solid state image pickup element in photographing.

4. An image pickup device comprising:

a solid state image pickup element on which an object light image is formed through a taking lens;

an optical low pass filter disposed so as to be able to advance and retreat with respect to a photographic optical system, said optical low pass filter for removing a spatial frequency component in a horizontal direction corresponding to the pixel pitch of said solid state image pickup element when advanced into said optical system;

an auto-focusing device for executing a focusing detection operation in accordance with an output signal obtained from said solid state image pickup element and for adjusting the focusing of said taking lens; and means for removing said optical low pass filter from said photographic optical system when the focusing detection is executed by said auto-focusing device, thereby preventing said optical low pass filter from removing the spatial frequency component in the horizontal direction and for advancing said optical low pass filter into said photographic optical system when the image pickup device is executing photographing, thereby allowing said optical low pass filter to remove the spatial frequency component.

* * * * *